United States Patent [19]

Bleckmann

[11] 4,113,321

[45] Sep. 12, 1978

[54] ANTI-SKID ELECTRONIC CONTROL SYSTEM HAVING AN ERROR DETECTING CIRCUIT

[75] Inventor: Hans W. Bleckmann, Frankfurt am Main, Fed. Rep. of Germany

[73] Assignee: ITT Industries, Inc., New York, N.Y.

[21] Appl. No.: 772,798

[22] Filed: Feb. 28, 1977

[30] Foreign Application Priority Data

Mar. 24, 1976 [DE] Fed. Rep. of Germany ....... 2612356

[51] Int. Cl.² .............................................. B60T 8/00
[52] U.S. Cl. ..................................... 303/92; 318/564
[58] Field of Search ................ 235/153 AE; 244/194; 303/93, 96, 92, 106, 97; 307/219; 318/563–565; 340/52 B, 53, 146.1 BE

[56] References Cited

U.S. PATENT DOCUMENTS

| | | | |
|---|---|---|---|
| 3,408,024 | 10/1968 | Iverson | 244/194 |
| 3,545,817 | 12/1970 | Yarber | 303/20 X |
| 3,602,554 | 8/1971 | Ichimura et al. | 303/92 |
| 3,658,389 | 4/1972 | Okamoto et al. | 188/181 A X |
| 3,744,854 | 7/1973 | Ooya et al. | 303/20 X |
| 3,920,280 | 11/1975 | Luhdorff et al. | 303/92 |
| 3,955,783 | 5/1976 | Glaze et al. | 244/194 X |

*Primary Examiner*—Stephen G. Kunin
*Attorney, Agent, or Firm*—John T. O'Halloran; Alfred C. Hill

[57] ABSTRACT

A secondary circuit identical to the primary arithmetic circuits is provided for an anti-skid electronic control system. The outputs of the secondary and primary circuits are connected in a predetermined manner to a comparator arrangement. If an error occurs in the secondary and/or primary circuits, the comparator will detect the error and render the entire anti-skid system inoperable.

7 Claims, 1 Drawing Figure

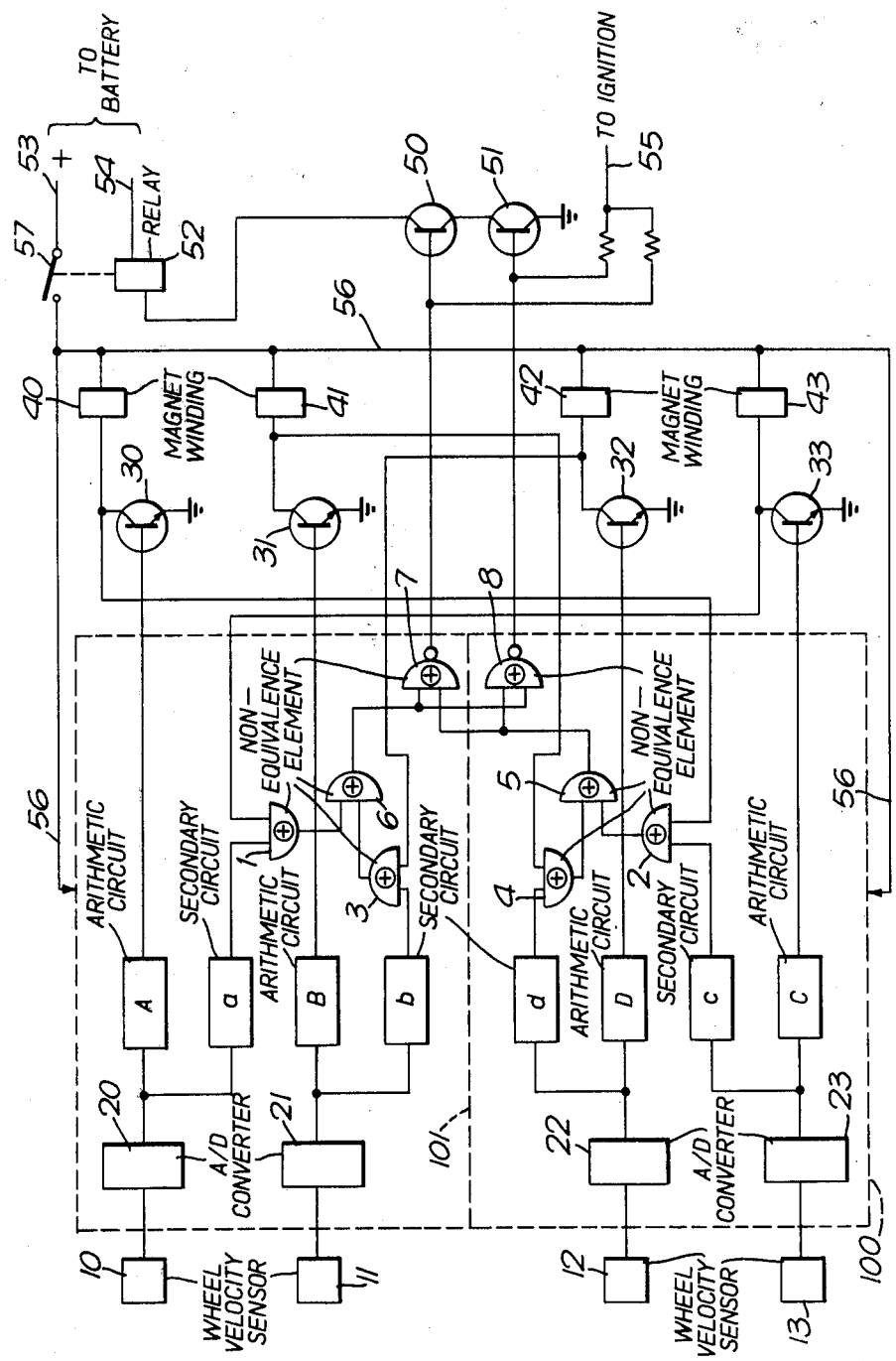

ANTI-SKID ELECTRONIC CONTROL SYSTEM HAVING AN ERROR DETECTING CIRCUIT

BACKGROUND OF THE INVENTION

This invention relates to a digital anti-skid electronic control system for automotive vehicles wherein each controlled wheel is assigned a channel of its own which comprises an analog-to-digital (A/D) converter converting measured signals into digital values, with an arithmetic circuit being connected thereto which provides an output signal adapted to control a final control element which controls the braking pressure.

In such anti-skid electronic control systems, which obviously will have a substantial influence on the behavior of the vehicle, it must be ensured at all times that a malfunction in the anti-skid electronic control system does not adversely affect the behavior of the vehicle. Therefore, if such a malfunction occurs, the entire anti-skid control system must be disconnected for which purpose monitoring circuits are used. However, a monitoring circuit cannot be regarded as fail-safe if malfunctions occurring in the monitoring circuit may in turn be the cause that a defect in the anti-skid control system is not sensed. The probability of such an occurrence becomes higher the greater the number of the individual components in the monitoring circuit is the function of which is not continuously monitored.

In anti-skid control systems incorporating a digital arithmetic circuit, it is a further difficulty to find the criteria which permit the detection of a faulty output signal. Therefore, to be able to provide a monitoring circuit, it is above all necessary that facilities for error detection are provided.

SUMMARY OF THE INVENTION

It is therefore the object of the present invention to provide a substantially intrinsically safe monitoring circuit for the arithmetic circuits provided in a plurality of channels of a digital anti-skid electronic control system.

A feature of the present invention is the provision of an improvement in a digital anti-skid electronic control system including a different channel assigned to each controlled wheel, each of the channels having a converter to convert a sensed wheel velocity signal into a digital value and a digital arithmetic circuit connected to the converter to provide an output signal to control a final control element which controls braking pressure, the improvement comprising: a digital secondary circuit, which is identical with the arithmetic circuit, coupled to a different one of the converter in each of the channels; a digital circuit means coupled to the arithmetic unit and the secondary circuit of each of the channels, the circuit means responding to predetermined pairs of output signals derived from each of the arithmetic circuits and each of the secondary circuits to detect an error condition in any of the arithmetic circuits and the secondary circuits and to disable the control system.

The advantages of this circuit arrangement are in particular that the comparators receive always signals which in a way happen to be sometimes equivalent, sometimes nonequivalent. As a result, it is always an alternating signal that is produced at the output of these comparators which sense either equivalence or nonequivalence. If one of these comparators fails, it will be unable to produce an alternating output signal as before so that there are no two equivalent alternating signals at the last comparator any longer, and the error condition can be detected at its output signal. If a failure occurs in an arithmetic or secondary circuit, the output signals of the arithmetic and secondary circuit of the channel concerned are no longer identical. While an alternating signal continues to be produced at the comparators, there are no longer two identical alternating signals presented to the last comparator.

In order to detect also a malfunction at the last comparator, which is not intrinsically safe, two last comparators are provided to which the same equivalent alternating signals are applied, and each of the two last comparators is in a position to sense a malfunction in an arithmetic or secondary circuit and to disconnect the whole anti-skid control. By virtue of such dual design of the last, not intrinsically safe, comparator it is ensured that the entire anti-skid control system can also be disconnected in the case of a malfunction of the last comparator. In this method, the two last comparators are the only elements in the whole circuitry which should be checked for proper functioning from time to time.

In an improvement of the invention, the output signals of the arithmetic circuits of each channel are applied to a power switch which is adapted to be connected to the final control element. The first control element has one terminal in permanent connection with a first terminal of a battery and second terminal which is selectively connected with a second terminal of the battery. The inverted output signal present at the connection for the second terminal of the final control element is to be applied to the comparator provided for the arithmetic circuit of that channel. Since it is irrelevant for the comparators whether they receive the output signals of the arithmetic circuits directly or by means of the final control element, this method provides simultaneously a monitoring function for the final control element. For instance, should the magnet winding of the final control element be defective, the associated comparator will not receive the inverted output signal of the arithmetic circuit concerned, which is an alternating signal, but rather an equipotential signal will be applied to this comparator, whereas the comparator connected to the secondary circuit of this channel continues to receive an alternating signal. In this method, it is also possible to detect an error function at the final control element.

BRIEF DESCRIPTION OF THE DRAWING

The above-mentioned and other features and objects of the present invention and the manner of obtaining them will become more apparent by reference to the following description taken in conjunction with the drawing, the sole FIGURE illustrates an embodiment in accordance with the principles of the present invention.

DESCRIPTION OF THE PREFERRED EMBODIMENT

As far as the internal function of the circuits and elements of the entire anti-skid control system is irrelevant for the monitoring circuit, these were illustrated in block form. Further, for the sake of simplicity of understanding, the resistors, protection diodes, etc. necessary for such a circuit are not illustrated in detail.

For example, the velocity sensors 10, 11, 12, 13 disposed at the wheels of the vehicle are shown in block form in the drawing. These sensors 10, 11, 12, 13 furnish, for instance, a pulse train corresponding to the rotational velocity of the wheel concerned. In the anti-skid control, each of these sensors 10 to 13 is assigned a channel of its own. The channels are identical with each other.

The output signal of sensor 10 is applied to an A/D converter 20 which converts the pulse train received from sensor 10 into a digital value suitable for further processing. The digital signal produced by converter 20 is presented to an arithmetic circuit A in which it is processed in such a manner that in the event of a locked-wheel condition, which is monitored by sensor 10, a control signal will be present at the output of arithmetic circuit A and be applied to transistor 30 which will thus establish a connection between magnet winding 40 and the ground connection of the vehicle. Magnet winding 40 has a second connection with a line 56 which is connected to the positive terminal of the battery as long as the anti-skid electronic control system operates trouble-free.

In the same manner, sensor 11, which monitors a second wheel, has an A/D converter 21 connected thereto the output of which is applied to an arithmetic circuit B which generates an output signal controlling via a transistor 31 a magnet winding 41 of a second final control element. Similarly, the sensors 12 and 13 are assigned such identical channels. The arithmetic circuit disposed in the channel of sensor 12 is identified by D, and the arithmetic circuit disposed in the channel of sensor 13 is identified by C. Although the arithmetic circuits A, B, C, D of the individual channels are identical, their output signals are often different since the individual vehicle wheels to which sensors 10 through 13 are fitted may assume different rotational velocities.

The arithmetic circuits A, B, C and D may be implemented in many ways from prior art circuits, such as U.S. Pat. No. 3,805,089, whose disclosure is incorporated herein by reference.

The magnetic windings 40 – 43 control a solenoid operated modulating valve in the hydraulic portion of the anti-skid signal, one of windings 40 – 43 being associated with a different modulating valve, each disposed in the four hydraulic brake lines leading to a different one of the four wheels.

In addition to the arithmetic circuit, each channel has a secondary circuit designated in the drawing by a small letter which corresponds to the capital letter of the arithmetic circuit of the associated channel. Thus, the channel of sensor 10 accommodates an arithmetic circuit A and a secondary circuit $a$, the channel of sensor 11 an arithmetic circuit B and a secondary circuit $b$, the channel of sensor 12 an arithmetic circuit D and a secondary circuit $d$, and the channel of sensor 13 an arithmetic circuit C and a secondary circuit $c$. Since the arithmetic and secondary circuits of all channels are identical, the output signals produced by arithmetic circuit A and secondary circuit $a$ are identical as well. Similarly, the output signals produced by arithmetic circuit D and secondary circuit $d$ are identical, however, they may differ from the output signals generated by arithmetic circuit A and secondary circuit $a$. Whether or not they differ will depend on the rotational behavior of the monitored wheels.

In the embodiment of the invention, non-equivalence elements are used as comparators designated by reference numerals 1 to 8 in the drawing. The output of secondary circuit $a$ connects with the one input of comparator 1. The other input of comparator 1 is connected to the output signal of arithmetic circuit C which is inverted by power switch 33 and magnet winding 43.

The output of secondary circuit $c$ is connected to the one input of comparator 2 while its other input connects with the output of arithmetic circuit A inverted by power switch 30 and magnet winding 40. In the same manner, the one input of comparator 3 connects with the output of secondary circuit $b$ and the other input connects with the inverted output of arithmetic circuit D. The one input of comparator 4 links with the output of secondary circuit $d$ and the other input connects with the inverted output of arithmetic circuit B. It is achieved by this method that an equivalent alternating signal is present at the outputs of comparators 1 and 2 and of comparators 3 and 4. The outputs of comparators 1 and 3 at which different alternating signals are present, and applied to the two inputs of a comparator 6. In the same manner, the outputs of comparators 2 and 4 are applied to the inputs of a comparator 5. Thereby, an equivalent alternating signal will be produced at the outputs of comparators 5 and 6. Each of these two equivalent alternating signals is presented to the inputs of comparators 7 and 8. The result is an equisignal at the outputs thereof.

If the whole anti-skid control operates without fault, i.e., if the same signal is present at the outputs of the associated arithmetic and secondary circuits, the output signal of comparators 7 and 8 will be a logical zero.

This output signal which, as indicated by the inverter symbol (circle 7 at the output of elements 7 and 8), is inverted to a logical "1" is used for maintaining transistors 50 and 51 in a conductive state so that relay 52, the second connector of which is linked via line 54 with the ignition of the vehicle, keeps contact 57 closed. This provides for connection of line 56, which supplies the whole anti-skid electronic control system with current, with a line section 53 which is connected to the positive terminal of the battery.

If one of the comparators 7 and 8 signals an error condition in the anti-skid electronic control system which results in a logical "1" at its output which, when inverted, will become a logical zero, this will suffice to block at least one of the transistors 50 and 51. As a rule, i.e., as long as the two comparators 7 and 8 are in order, the two transistors 50 and 51 will be blocked simultaneously. This makes relay 52 currentless so that contact 57 will open and cause the whole anti-skid electronic control system to be currentless, thereby disabling it from controlling the braking any longer.

When the engine is started, the whole anti-skid electronic control system is put in circuit by means of a starter signal present on a line 55; this starter signal renders the two transistors 50 and 51 conductive independent of the output signal of comparators 7 and 8 so that relay 52 will pick up, i.e., close contact 57, whereby the anti-skid electronic control system is excited during the engine starting operation and starts operating. Still before the engine starting operation is terminated, and provided no error condition is detected in the anti-skid electronic control system, comparators 7 and 8 will furnish an output signal which causes transistors 50 and 51 to remain in their conductive state.

Therefore, once the anti-skid electronic control system is switched out of circuit because transistors 50 and 51 have become blocked due to an error condition detected in an arithmetic or secondary circuit, it will remain in the disengaged state at least until the beginning of the next engine starting operation.

While I have described above the principles of my invention in connection with specific apparatus it is to be clearly understood that this description is made only by way of example and not as a limitation to the scope of my invention as set forth in the objects thereof and in the accompanying claims.

I claim:

1. An improvement in a digital anti-skid electronic control system including a different channel assigned to each controlled wheel, each of said channels having a converter to convert a sensed wheel velocity signal into a digital value and a digital arithmetic circuit connected to said converter to provide an output signal to control a final control element which controls braking pressure, said improvement comprising:

a digital secondary circuit for each of said channels, each of said secondary circuits being identical with one of said arithmetic circuits, each of said secondary circuits being connected to the output of a different one of said converters; and a digital circuit means coupled to said arithmetic circuit and said secondary circuit of each of said channels, said circuit means being responsive to predetermined output signals from each of said arithmetic circuits and each of said secondary circuits to detect an error condition in any of said arithmetic circuits and any of said secondary circuits and to disable said control system entirely upon detection of said error condition.

2. An improvement according to claim 1, wherein said channels number four, and said circuit means includes a first comparator having one input coupled to a secondary circuit of a first of said four channels and another input coupled to an arithmetic circuit of a fourth of said four channels, a second comparator having one input coupled to a secondary circuit of a second of said four channels and another input coupled to an arithmetic circuit of a third of said four channels, a third comparator having one input coupled to the output of said first comparator and another input coupled to the output of said second comparator, a fourth comparator having one input coupled to a secondary circuit of said third of said four channels and another input coupled to said arithmetic circuit of said second of said four channels, a fifth comparator having one terminal coupled to a secondary circuit of said fourth of said four channels and another terminal coupled to said arithmetic circuit of said first of said four channels, a sixth comparator having one input coupled to the output of said fourth comparator and another terminal coupled to the output of said fifth comparator, a seventh comparator having one input coupled to the output of said third comparator and another input coupled to the output of said sixth comparator, and an eighth comparator having one input coupled to the output of said third comparator and another input coupled to the output of said sixth comparator, each of said seventh and eighth comparators being capable of detecting said error condition in any of said arithmetic circuits and any of said secondary circuits and to disable said control system.

3. An improvement according to claim 2, further including four power switches each coupled to a different one of said arithmetic circuits;

four final control elements each coupled to a different one of said four switches, said final control element having one side permanently connected to a first terminal of a battery and the other side coupled to a second terminal of said battery, said other side coupling an inverted output of said four arithmetic units to said other inputs of said first, second, fourth and fifth comparators.

4. An improvement according to claim 3, further including two additional power switches coupled to said seventh and eighth comparators; and a relay coupled to said battery and said two additional power switches;

said seventh and eighth comparators in the absence of error condition provide output signals therefrom to control said two additional power switches to maintain said relay in a closed condition to enable coupling power from said battery to said control system.

5. An improvement according to claim 4, wherein said two additional power switches are connected in series.

6. An improvement according to claim 5, wherein said relay can be moved into a closed condition by means of a starter signal coupled to said two additional power switches independent of the operating state of said control system.

7. An improvement according to claim 1, wherein said control system can be actuated by a vehicle starter signal.

* * * * *